_United States Patent_ [19]

Sachs

[11] 3,728,549
[45] Apr. 17, 1973

[54] IN SITU DEVICE FOR MEASURING LIGHT SCATTERING
[75] Inventor: Peter L. Sachs, Falmouth, Mass.
[73] Assignee: The United States of America as represented by the Secretary of the Navy
[22] Filed: Apr. 12, 1972
[21] Appl. No.: 243,140

[52] U.S. Cl................250/218, 250/210, 340/4 R, 179/1 UW
[51] Int. Cl. ............................................G01n 21/26
[58] Field of Search..............250/218, 210, 222; 340/4 R; 356/103, 104, 207, 208; 179/1 UW

[56] References Cited

UNITED STATES PATENTS

| 3,094,625 | 6/1963 | Hendrick, Jr.................250/218 X |
| 3,233,781 | 2/1966 | Grubbs..........................250/210 X |
| 3,278,753 | 10/1966 | Pitts et al...........................250/218 |
| 3,688,029 | 8/1972 | Bartoe, Jr. et al................179/1 UW |

Primary Examiner—Walter Stolwein
Attorney—R. S. Sciascia et al.

[57] ABSTRACT

A self-contained, telemetering, fixed small angle forward scatterance meter for furnishing real-time data on light scattering intensity is provided. Collimated light from a laser is directed through the water, scattered light reaching a photosensitive surface which is offset from the axis of the laser beam a selected short distance. Variations in ambient temperature and laser intensity are compensated for by a reference photocell which is matched to the measuring cell. Data representative of light scattering is continuously telemetered and received and recorded at a remote location. This data provides a continuous profile of readings related to the concentration of matter in suspension as determined by gravimetric analysis of samples collected while the device is disposed in the medium.

7 Claims, 6 Drawing Figures

IN SITU DEVICE FOR MEASURING LIGHT SCATTERING

The present invention concerns measuring particulate matter and more particularly means for determining the distribution and composition of suspended particulate matter in open ocean areas.

One current procedure for determining particulate distribution and composition in the ocean involves the collection of discrete samples taken from large volumes of water, processing in situ or on board ship, and subsequently analyzing the samples in the laboratory. A second procedure comprises taking continuous in situ measurements of light scattering and relating these measurements to the concentration and physical properties of the suspended particles separately collected after laboratory analysis of the particles. The first procedure, although affording accurate and detailed physical and chemical analyses, is frequently inefficient because many of the samples are either redundant or are too widely or inappropriately spaced to provide useful information. The continuous profile approach of the second procedure presents a good assay of the variability of particle distribution and composition, but the physical and chemical composition of the particles can be inferred only in general terms where no subsequent laboratory analysis is possible. It will be appreciated, therefore, that an improved sampling program is required in which the two presently used procedures can effectively complement each other. The present invention contributes such a combination in providing an optical method and means for performing a continuous, real-time, in situ survey to study interesting features of a suspended phase distribution profile.

In the present invention, an in situ self-contained telemetering, fixed small angle forward scatterance meter is provided to present an approximation of the suspended matter concentration variability necessary to complement the discrete sampling programs of prior methods of particulate distribution determination. A laser beam, providing an economical source of collimated light, is directed vertically while a light measuring cell is positioned transversely from the path of the laser beam so that only scattered light will reach the photosensitive surface of the cell. Power is furnished by two series strings of nickel-cadmium batteries connected in parallel, and a reference photocell matched to the measuring cell is used to compensate for variations in temperature and in laser beam intensities. A weight-summing amplifier having a gain which varies on the order of from unity to 500 is included to amplify the output of the cells, which output is transmitted to a remote receiver and recorder by an acoustic telemeter.

Accordingly, it is an object of the present invention to provide a compact, sturdy and economical means for conducting in situ measurement of light scattering.

It is another object of the invention to provide means for obtaining an in situ approximation of suspended matter concentration variability to complement a discrete sampling program.

It is a further object of the invention to provide a self-contained telemetering means for producing a continuous profile of light scattering intensity from near the surface to any depths.

Other objects, advantages and novel features of the invention will become apparent from the following detailed description thereof when considered in conjunction with the accompanying drawings in which like numerals represent like parts throughout and wherein.

Figure 1:
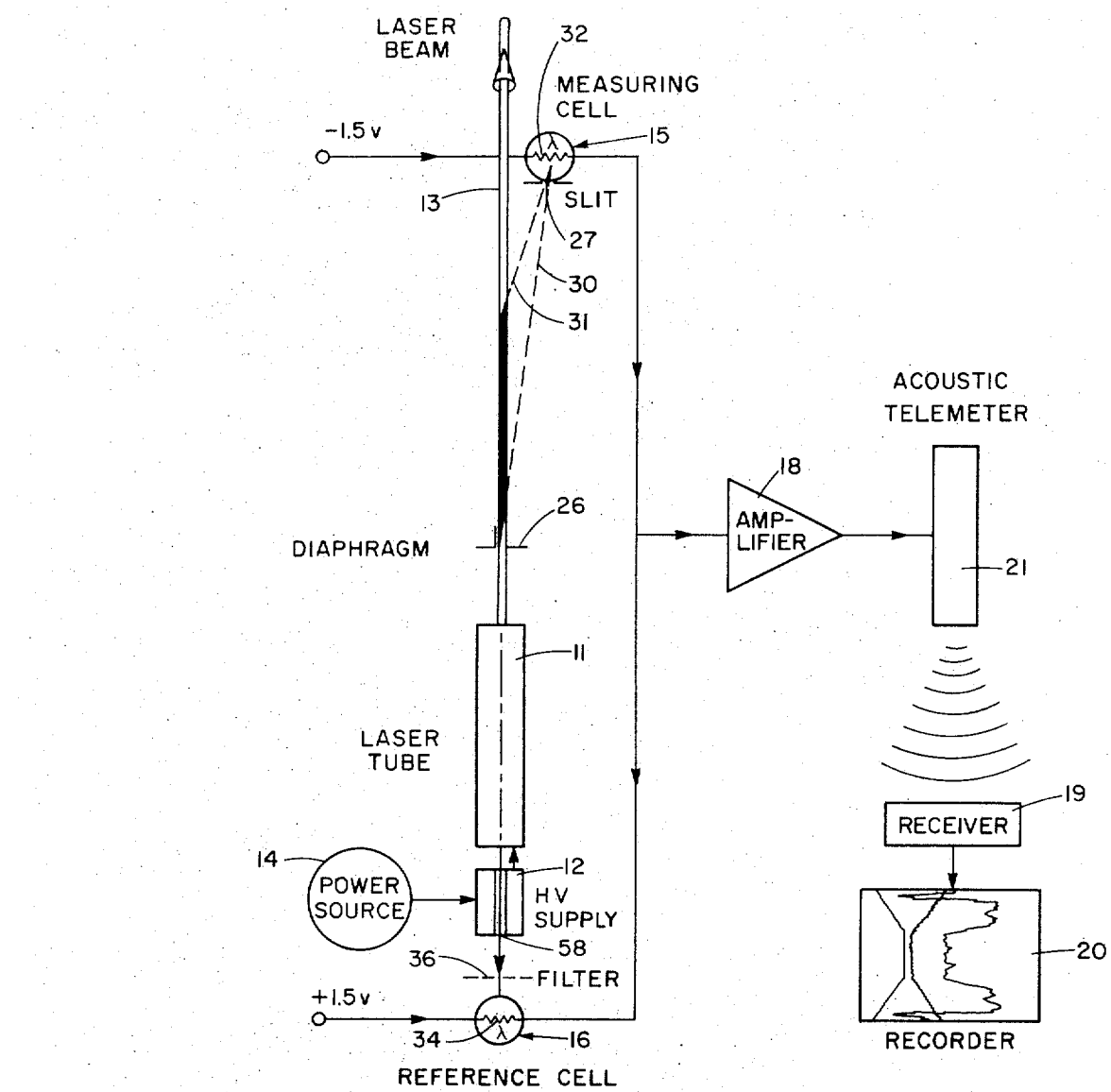
FIG. 1 is a schematic presentation of the operative components of the invention.
Figure 2:
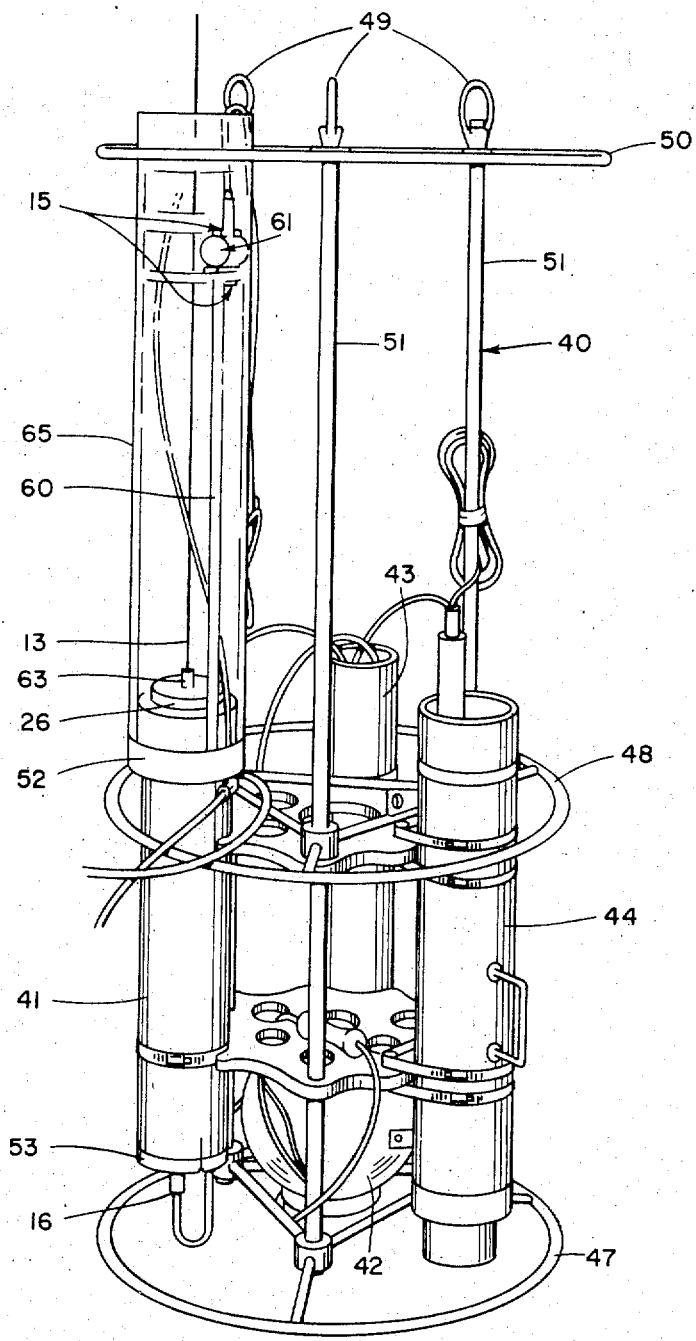
FIG. 2 is a perspective view of the physical arrangement of components of one embodiment of the invention.

Referring to FIG. 1, one embodiment of the invention is presented schematically and includes a laser tube 11 which is powered by a high voltage supply 12 and is disposed in a vertical attitude so as to direct a laser beam 13 vertically through the water. The high voltage supply 12 is energized by a power source 14 comprising preferably a plurality of low voltage batteries arranged in two series banks connected in parallel. A measuring cell 15 is displaced a relatively short distance laterally from the axis of laser beam 13 above laser tube 11 and a reference cell 16 is oppositely positioned with respect to laser tube 11 so as to intercept the small fraction of energy which is emitted from the rear of the laser tube. The differential output of cells 15 and 16 is amplified in an amplifier 18 and transmitted to a remote receiver 19 and recorder 20 by an acoustic telemeter 21. A diaphragm 26 is selectively positioned with respect to laser tube 11 and measuring cell 15 so as to permit forward scattered light from beam 13 to impinge on cell 15 through a slit 27 which may be formed by strips of electrical tape. The scattered light passing through slit 26 approaches from a wide range of angles as indicated by lines 30 and 31 with light from angles of about 3° to about 45° emanating from a segment of the beam impinging on a photosensitive element 32 in cell 15. Light impinging at the larger angles has a negligible effect in the invention since light from these angles is considerably less intense than the light from the smaller angles. The angle of impinging may be altered by the size of slit 27 and the distance of cell 15 from beam 13 and diaphragm 26. The cell mounting and diaphragm 26 are movably installed to afford a desired range of distance selections. Photosensitive element 32 and a corresponding photosensitive element 34 in reference cell 16 are maintained at −1.5 volts and +1.5 volts respectively. Reference cell 16 is matched to measuring cell 15 and is used to compensate for variations in ambient temperatures and for variations in laser intensity. Cell 16 is housed in the same type of housing as is cell 15 and is exposed to the same environment. Its housing shares a Plexiglas window with the lower end cap of the laser tube housing 41 which is shown in FIG. 2. The reference beam which is emitted through the lower window of the laser tube housing is directed to photosensitive surface 34 through a neutral filter 36 to further reduce the intensity of the beam to a value within the range of the sensing cell so that both cells may operate close to the same portion of a non-linear response curve.

In FIG. 2, the physical arrangement of the components in an open frame 40 is shown. Laser tube 11 and its high voltage supply 12 are contained in a housing 41, and the power source or battery supply 25 is contained in a housing 42. Amplifier 18 is contained in a housing 43 while a telemetering pinger, not shown, and associated equipment is contained in a housing 44. Housings 41, 43 and 44 are secured within circumferential frame members 47 and 48 in a balanced arrangement so that the device will maintain a vertical attitude when suspended on hydrographic wire, not shown, from bails 49 which are secured to a third circumferential frame member 50 and longitudinally extending member 51. As previously indicated, measuring cell 15 is mounted a substantial distance above laser housing 41 and diaphragm 26 according to the scope of divergence angle desired.

Laser tube 11 in the present embodiment is a helium-neon continuous type having a power output of 1.5 milliwatts and a wave length of 632.8 nanometers. The tube is supported by an aluminum bench, not shown, which has provisions for optically aligning an upper and a lower window, also not shown. The bench in turn is suspended from the inside face of an upper end cap 52 of the preferably aluminum pressure housing 41 so that dimensional changes of the housing due to temperature and pressure variations will not affect alignment of the tube optics. A lower end cap 53 seals the other end of the housing and supports reference cell 16. The upper and lower windows preferably are made of 4 cm thick Plexiglas. The intense collimated beam 13 of the laser is directed through the upper window while a small fraction of energy emitted from the rear of the tube as a reference beam is directed through the lower window to reference cell 16. The lower part of the laser housing contains a 2 kv DC to DC converter and a 2.5 V, 2.4 ampere filament supply. Components of the supply, not shown, preferably are cast in a cylinder as indicated in FIG. 1 having a concentric hole 58.

Attached to the outside of upper end cap 52 of laser housing 41 is a rigid three legged frame 60 which at its upper end supports a measuring cell mounting 61. Also attached to the upper end cap is diaphragm 26 having a pinhole in a membrane, not shown, and a shield 63 to prevent reflected light from leaving the edge of the pinhole in any but a substantially vertical line. The diaphragm prevents a halo of light from occurring around the primary beam due to the projection of scatter in the plexiglas window.

Surrounding frame 60 and extending above measuring cell 15 is a calibration tank 65 which is removed when in situ measurements are made. The tank is sealed at its bottom and provided with an inlet and outlet so that water within it may be circulated through a filter, not shown. The tank is used only for calibration and for nulling the instrument at sea.

Figure 3:
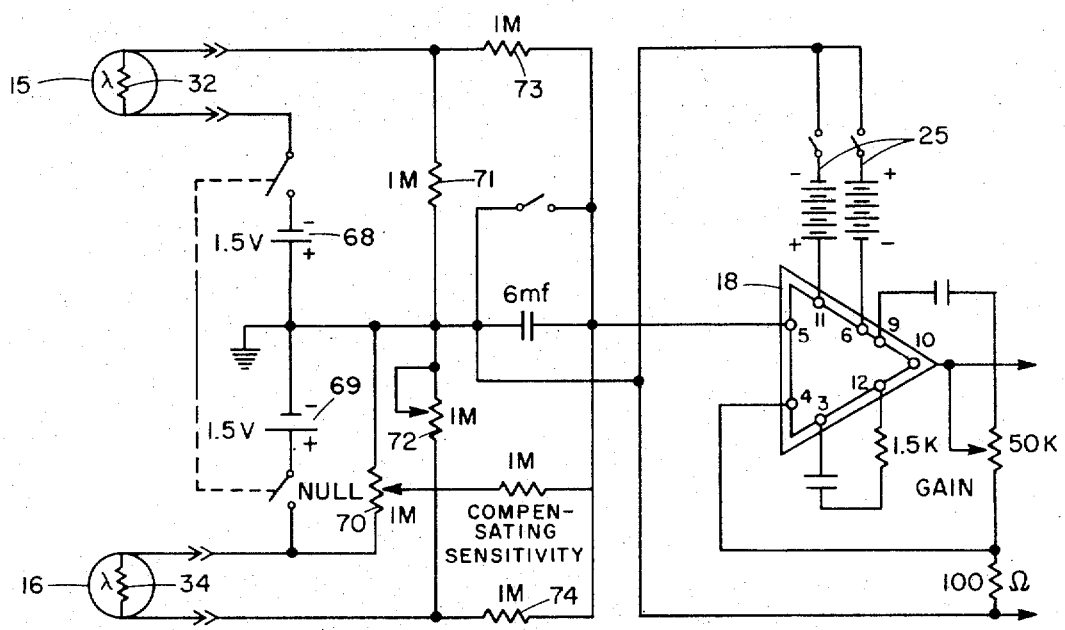
FIG. 3 is a schematic diagram of an amplifier circuit used in the embodiment of FIG. 2.

The schematic diagram of FIG. 3 shows one embodiment of a weighted-summing amplifier which may be used in connection with the invention. Measuring cell 15 and reference cell 16 are connected at one terminal of their sensing elements to 1.5 volt batteries 68 and 69, respectively, while the other terminals of the sensing elements are connected in parallel with a nulling potentiometer 70 and a plurality of compensating resistors 71, 72, 73 and 74. The output of the cells is fed to monolithic operational amplifier 18 such as Texas Instruments' amplifier Ser. No. 72709N having selected gain and time-constant adjustments. The input circuit is controlled by the conductivity of the two photocells and nulling potentiometer 70. Although the gain of the amplifier may be varied from unity to 500, a gain of 50 or less and a time constant of about 5 seconds has been found to be suitable. Batteries 68 and 69 are contained with the amplifier in amplifier housing 43.

The output of amplifier 18 ranges from 1 to 4 volts DC and is fed preferably to a 12 KHz acoustic telemeter 21 such as that manufactured by AMF Electrical Products Development Division, 1025 North Royal Street, Alexandria, Va. 22314. This telemeter emits a 2 millisecond pulse at a constant rate of 1 per second. This pulse is followed by a 2 millisecond data pulse which occurs from 64 to 464 milliseconds later depending upon the data value at the time of transmission. The pulses are received by receiver 27 and displayed by conventional oceanographic echo-sounding recorder 28 at a 1 second sweep rate.

Figure 4:
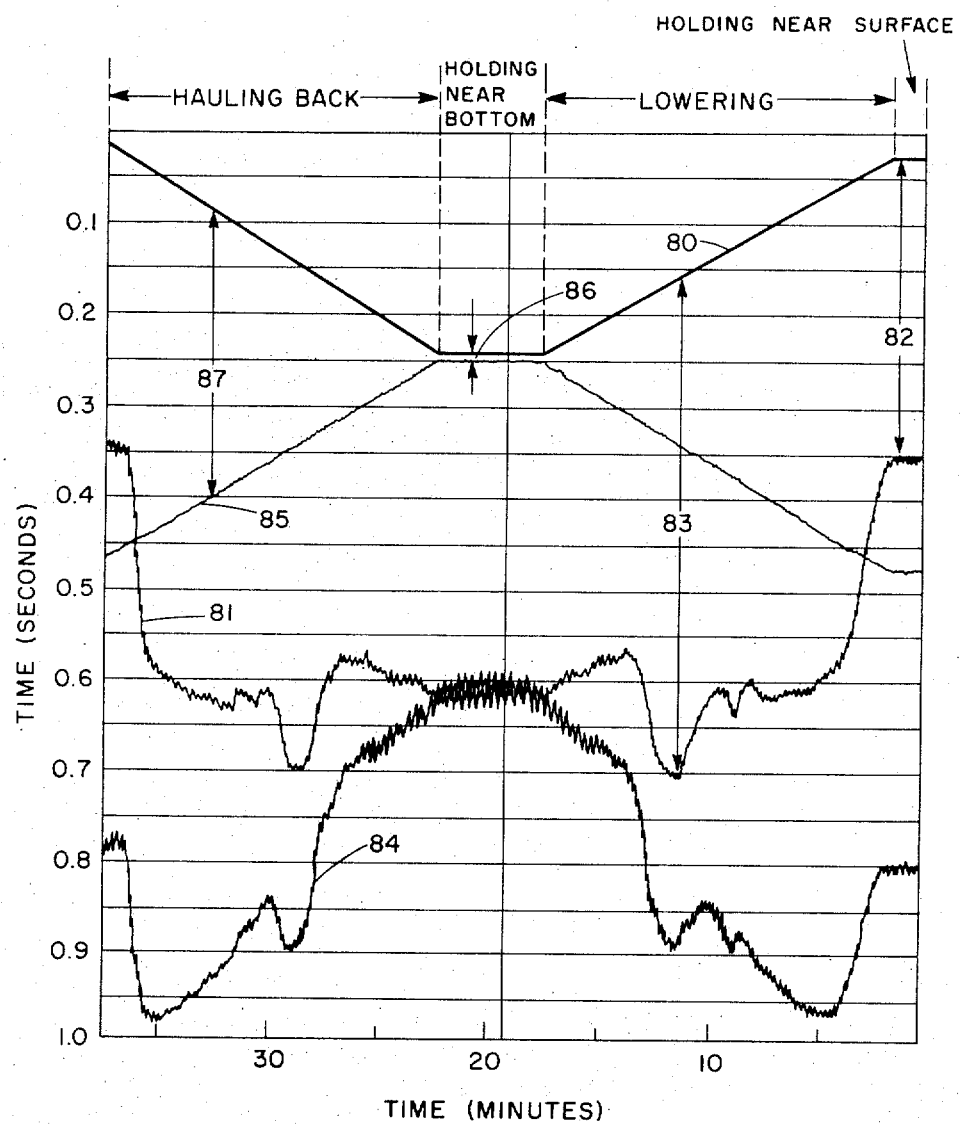
FIG. 4 is a graphical presentation showing the recording of data taken during one cycle of operation.

A typical record produced when the scatterance meter is lowered, held near the bottom, and hauled back is shown in FIG. 4. When plotted against time, the succession of clock and data pulses generates lines 80 and 81, respectively, with the distance between the lines as indicated at 82 or 83 being a function of the light intensity sensed by cell 15. Line 84 is produced by the bottom reflections of the data pulses while line 85 is produced by echoes of the clock pulses. The distance between line 80 and line 85 as measured, for example, at 86 or 87, is a function of the height of the instrument above the bottom.

Figure 5:
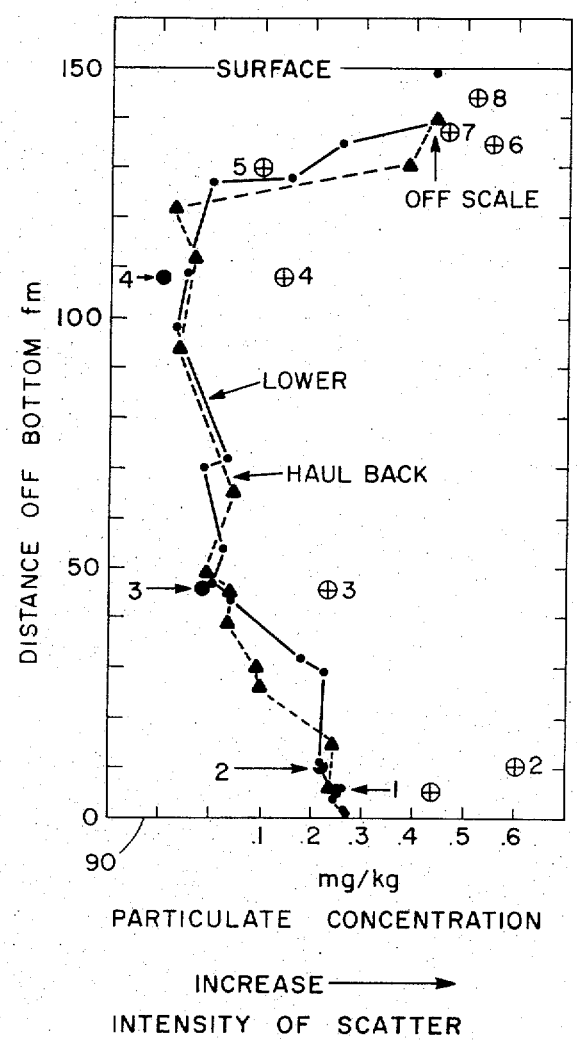
FIG. 5 is a plot of the data obtained at a selected station.

FIG. 5 shows a plot of data obtained from a station located in the Gulf of Maine. The connected points in graph 90 indicate relative values of scatter picked from the recorder sheet as previously outlined. The solid line connecting small circles in graph 90 represents values obtained while the instrument was lowered, whereas the broken line connecting small triangles represents values obtained when the instrument was hauled back to the surface. The two curves are in fairly close agreement, examination of all the records thus far obtained indicating that the small scale differences probably represent real variations in scatterance due perhaps to changes in water character. Intense scatter at a depth of about 18 meters (140 to 150 fathoms off the bottom), due to high concentrations of near surface plankton, caused the instrument to go off-scale at this station. The clusters of points near the bottom represent readings taken while the instrument was held near the bottom for some time. The large open circles numbered 1 to 8 represent values for gravimetric analyses of the suspended matter filtered from discrete water samples taken at the indicated distances off the bottom. The large filled circles represent the relative value of scatter at the time samples 2 to 4 were taken. Sample 1 was obtained during the lowering plotted, while samples 5 to 8 were taken immediately after the last scatterance meter lowering. Particulate matter samples were obtained in conjunction with the lowerings by means of a 30 liter water sampler clamped to the hydrographic suspension wire, not shown, immediately above the scatterance meter. A sample was taken by holding both instruments at the desired depth and sending a messenger to close the sampler. The water samples were filtered on board through a pre-weighed pair of commercially available filters and processed in a conventional manner.

Figure 6:
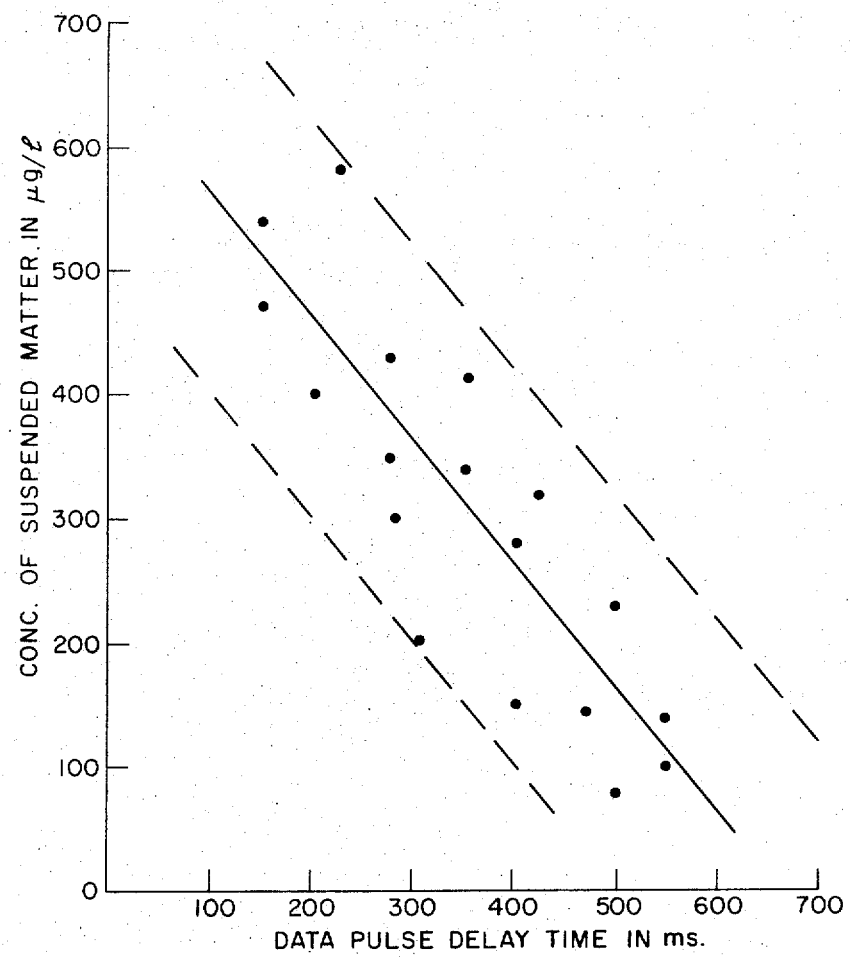
FIG. 6 is a plot of suspended particulate matter concentrations versus data pulse delay time.

FIG. 6 is a plot of suspended particulate matter concentrations from the Gulf of Maine samples versus data pulse delay time as recorded on a precision graphic recorder such as that manufactured by Alden Electronic and Impulse Recording Equipment Co., Westboro, Mass. Near-surface samples where plankton predominates and near bottom samples consisting mainly of inorganic particles were included. Although theoretically the relation between these measurements is exponential, over the limited range of suspended matter concentrations that have been encountered, approximately 50 to 600 $\mu$g/l, the scatter appears to fit a linear relationship theory. A considerable variance in suspended matter weights which has been noted is believed to be due to regression with light scattering. An unexplained variance is probably due largely to errors in the gravimetric measurement of suspended matter concentrations at lower levels. In general, displacement of the gravimetric values from those expected on the basis of the scattering curve of graph 90 are attributed to a large extent to accumulative errors in collecting and weighing milligram quantities of particulates.

There is thus presented a self-contained telemetering fixed small angle forward scatterance meter which is intended for in situ operation. The instrument is rugged and reliable and therefore suitable for routine shipboard use. It has been very effective in providing an approximation of suspended matter variability to complement an independent discrete sampling program. A multiplicity of data on particulate concentration may be obtained rapidly and easily to form a continuous profile of the disposition and composition of suspended particulate matter in open ocean areas. Although discrete sampling is at the present state of the art essential for a detailed physical and chemical analysis, such sampling is readily obtainable in conjunction with light scattering measurements by attaching a desired number of sampling tubes to frame 40 and collecting samples during selected phases of the operation of the device by opening the tubes with messengers or other conventional remote actuating devices.

The data obtained permits a composite of the distribution of matter throughout ocean areas to be constructed, such a composite adding to our knowledge as to what factors determine the migration or movement of particles and how changes in concentration and kind may be affected by storms, currents and other natural phenomena.

The invention is superior to related instruments in that information may be obtained merely through lowering and raising the instrument whereas in the prior art it was necessary to photograph light scatter and develop the film before the data could be obtained. The equipment in either case is so elaborate, heavy and bulky as to preclude use of the apparatus in conjunction with a frame suspended by hydrographic wire. Other efforts in this area have been directed to determining particulate concentrations in liquids flowing through a conduit or a fluid zone wherein intersecting beams are necessary to detect particles. No elaborate system of slits is required in the invention and alignment is not critical as long as it does not change during a measuring sequence.

Obviously, many modifications and variations of the present invention are possible in the light of the above teachings. For example, a different, more sensitive amplifier circuit may be used which would detect the ratio of readings of one cell over the other in lieu of detecting the difference between readings as in the circuit described.

What is claimed is:

1. Apparatus for measuring suspended particulate concentrations comprising:
   a laser for generating and directing a narrow, collimated, high intensity light beam;
   an elongate supporting frame and said laser attached thereto so as to direct said light beam substantially parallel to the longitudinal axis of said frame;
   a first photosensitive means mounted on said frame a selected short distance from said light beam and a selected longer distance from said laser in the direction in which said beam is projected;
   means interposed between said first photosensitive means and said light beam for admitting light at selected angles of divergence to said first photosensitive means;
   a second photosensitive means mounted on said frame remote from said first photosensitive means with respect to said laser and substantially aligned with the axis of said light beam;
   an amplifier;
   means coupling the outputs of said first and second photosensitive means to said amplifier;
   an acoustic telemeter coupled to said amplifier for transmitting data to a remote station;
   a power source connected to said amplifier and said telemeter;
   receiver means at said remote station adapted to receive said transmitted data; and
   a recorder connected to said receiver means, whereby a substantially instantaneous record may be obtained of the concentrations of particulate matter at any depth by the comparison and transmission of the light sensed by said first and second photosensitive means.

2. The apparatus as defined in claim 1 wherein said means interposed between said first photosensitive means and said light beam is a slit disposed transverse to the longitudinal axis of said light beam,
   said slit offset from said axis a selected distance so as to permit light to impinge on said first photosensitive means at angles of divergence from said light beam on the order of from 0° to 50°.

3. The apparatus as defined in claim 2 wherein particulate concentrations are determined by the difference in light intensity sensed at said first and second photosensitive means.

4. The apparatus as defined in claim 2 wherein particulate concentrations are determined by the ratio of the light intensity sensed at said first and second photosensitive means.

5. The apparatus as defined in claim 4 wherein said power source is self-contained in said apparatus and said telemeter emits a control pulse each second followed by a data pulse over a range on the order of from 50 to 500 milliseconds so that recordings may be readily distinguishable at a convenient rate of lowering and raising said apparatus.

6. Apparatus for measuring suspended particulate concentrations and transmitting acquired data to a remote station comprising:

open frame means for immersion in a fluid;

a beam source of collimated light mounted on said frame in a housing which is impermeable to said fluid;

a first photosensitive means mounted on said frame in a housing which is impermeable to said fluid for intercepting scattered light from the beam emanating from said beam source;

a second photosensitive means mounted on said frame in a housing which is impermeable to said fluid and in the path of the beam emanating from said beam source to provide in relation to said first photosensitive means a reference for determining the degree of scattering caused by particles in said fluid;

means interposed between said first photosensitive means and said light beam for admitting light at selected angles of divergence from the light beam to said first photosensitive means;

an amplifier mounted on said frame in a housing which is impermeable to said fluid;

means coupling the outputs of said first and second photosensitive means to said amplifier;

an acoustic telemeter coupled to said amplifier for transmitting data to a remote station;

a power source mounted on said frame in a housing which is impermeable to said fluid;

means connecting said power source to said amplifier and said telemeter;

receiver means at said remote station adapted to receive said transmitted data; and a recorder connected to said receiver means, whereby a substantially instantaneous record may be obtained of the concentrations of particulate matter at any depth by the comparison and transmission of the light sensed by said first and second photosensitive means.

7. The apparatus as defined in claim 6 wherein said second photosensitive means is disposed to the rear of and adjacent to said beam source in the path of the fractional intensity beam emanating therefrom.

* * * * *